Patented Dec. 8, 1936

2,063,286

UNITED STATES PATENT OFFICE 2,063,286

NAPHTHALENE POLYCARBOXYLIC ACID DERIVATIVE AND PROCESS FOR PREPARING THE SAME

Max Wyler, Blackley, Manchester, England, assignor to Imperial Chemical Industries Limited, a corporation of Great Britain No Drawing. Application May 23, 1935, Serial No. 23,129. In Great Britain May 23, 1934

8 Claims. (Cl. 260—108)

This invention relates to the manufacture of new naphthalene derivatives, suitable as intermediates for the manufacture of dyestuffs.

I have found that naphthalene-1,4,5-tricarboxylic acid may be converted to naphthalimide-$\alpha$-carboxylic acid by heating it with ammonia or a substance yielding ammonia.

I have also found that naphthalimide-$\alpha$-carboxylic acid, which is a new substance, may be converted to 1-aminonaphthalene-$\alpha$,8-dicarboxylic acid by the Hofmann reaction, i. e. by contacting with a halogen in an alkaline medium, or a substance yielding halogen, also in an alkaline medium.

I have also found that 1-aminonaphthalene-$\alpha$,8-dicarboxylic acid, which is also a new substance, may be converted to naphthostyril-$\alpha$-carboxylic acid by dehydrating, for example by heating. Naphthostyril-$\alpha$-carboxylic acid is also a new substance.

Working according to my invention naphthostyril-$\alpha$-carboxylic acid can be obtained in excellent yield and quantity from naphthalene-1,4,5-tricarboxylic acid. This result is surprising because it is known that naphthostyril itself cannot be prepared in satisfactory yield and quantity from naphthalic acid.

It is an object of my invention to prepare new compounds, which compounds are suitable as intermediates for the manufacture of dyestuffs, namely, naphthalimide-$\alpha$-carboxylic acid, 1-aminonaphthalene-$\alpha$,8-dicarboxylic acid and naphthostyril-$\alpha$-carboxylic acid.

A further object of my invention is to provide a process for obtaining the above new compounds in excellent yield and purity.

Further objects of my invention will appear hereinafter.

The new compounds of my invention may be represented by the general formula

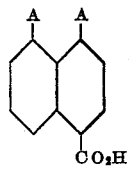

where A and A stand for substituents from the following group (a) one A stands for NH$_2$ and the other for CO$_2$H (b) A and A taken together stand for the grouping NHCO (c) A and A taken together stand for the grouping CONHCO.

It will be evident that theoretically the 1-aminonaphthalene-$\alpha$,8-dicarboxylic acid and the naphthostyril-$\alpha$-carboxylic acid should be obtained in two isomeric forms. Whether the products of my invention are single isomers or a mixture of both has not yet been determined.

The following examples in which parts are by weight illustrate but do not limit the invention.

Example 1.—50 parts of naphthalene-1,4,5-tricarboxylic acid (prepared according to the process described in copending U. S. application Ser. No. 454 filed January 4, 1935), and 150 parts of ammonia solution (34%) are boiled under reflux for 2 hours. On cooling the ammonium salt of naphthalimide-$\alpha$-carboxylic acid crystallizes out. The ammonium salt may be converted to the free acid by treatment with acid in the usual way.

Example 2.—A quantity of the ammonium salt of naphthalimide-$\alpha$-carboxylic acid equal to that obtained in Example 1 is dissolved in 500 parts of water and 8 parts of caustic soda and warmed until no more ammonia is evolved. The resulting solution is cooled to 10° C., 24 parts of caustic soda are added and 91 parts of sodium hypochlorite containing 15% by weight of chlorine are poured in. After 12 hours the slight excess of chlorine which remains is destroyed by adding sodium bisulphite solution, the mixture is then warmed to 80° C. and made acid with hydrochloric acid. White crystals of 1-aminonaphthalene-$\alpha$,8-dicarboxylic acid separate, and may be filtered, washed and dried.

Example 3.—The suspension of white crystals obtainable in Example 2 is warmed, when the white crystals turn yellow. The yellow crystals are filtered off, washed with a little water and dried. The resulting naphthostyril-$\alpha$-carboxylic acid is a yellow crystalline substance melting at 340° C., and easily soluble in aqueous soda or caustic alkali. Upon heating with a 10% solution of caustic alkali, the naphthylamine dicarboxylic acid is reformed.

I claim:

1. The process for producing a naphthostyril-$\alpha$-carboxylic acid which comprises heating naphthalene-1,4,5-tricarboxylic acid with ammonia to form naphthalimide-$\alpha$-carboxylic acid, treating the same in alkaline solution with a halogen to form a 1-aminonaphthalene-$\alpha$,8-dicarboxylic acid and dehydrating the resulting product to form a naphthostyril-$\alpha$-carboxylic acid.

2. The process which comprises heating naphthalene-1,4,5-tricarboxylic acid with aqueous ammonia at its boiling point to produce naphthalimide-$\alpha$-carboxylic acid.

3. The process which comprises subjecting naphthalimide-α-carboxylic acid to the action of a halogenating agent in alkaline solution to form a 1-aminonaphthalene-α,8-dicarboxylic acid.

4. The process which comprises dehydrating a 1-aminonaphthalene-α,8-dicarboxylic acid by heating the same to form naphthostyril-α-carboxylic acid.

5. A compound of the class consisting of naphthalimide-α-carboxylic acid, 1-aminonaphthalene-α,8-dicarboxylic acid and naphthostyril-α-carboxylic acid, said compounds respectively being identical with those obtainable from 1,4,5-naphthalene-tricarboxylic acid when the same is subjected to amidation with ammonia, the resulting compound is subjected to the Hofmann reaction, and the second resulting compound is subjected to dehydration.

6. A naphthostyril-α-carboxylic acid having a melting point of about 340° C.

7. Naphthalimide-α-carboxylic acid.

8. A 1-aminonaphthalene-α,8-dicarboxylic acid being identical with the product obtainable from naphthalimide-α-carboxylic acid when the same is subjected to the Hofmann reaction.

MAX WYLER.